United States Patent
Cai et al.

(10) Patent No.: US 9,251,040 B2
(45) Date of Patent: *Feb. 2, 2016

(54) REMOTE DEBUGGING IN A CLOUD COMPUTING ENVIRONMENT

(71) Applicant: International Business Machines Corporation, Armonk, NY (US)

(72) Inventors: Junjie Cai, Durham, NC (US); Jia Fei, Shanghai (CN); Xin Peng Liu, Beijing (CN); Heng Wang, Shanghai (CN); Yan R. Wu, Princeton, NJ (US); Si Qi Zhong, Shanghai (CN)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/164,400

(22) Filed: Jan. 27, 2014

(65) Prior Publication Data

US 2014/0366004 A1    Dec. 11, 2014

(30) Foreign Application Priority Data

Jan. 31, 2013    (CN) .......................... 2013 1 0039292

(51) Int. Cl.
*G06F 11/36*    (2006.01)
*H04L 29/08*    (2006.01)

(52) U.S. Cl.
CPC .......... *G06F 11/3664* (2013.01); *G06F 11/362* (2013.01); *H04L 67/025* (2013.01)

(58) Field of Classification Search
None
See application file for complete search history.

(56) References Cited

U.S. PATENT DOCUMENTS

| | | | |
|---|---|---|---|
| 6,042,614 A | 3/2000 | Davidson et al. | |
| 6,058,393 A | 5/2000 | Meier et al. | |
| 7,185,319 B2 | 2/2007 | Kaler et al. | |
| 7,363,543 B2* | 4/2008 | Peebles et al. | 714/26 |
| 7,444,552 B2 | 10/2008 | Kilian | |
| 7,512,934 B2 | 3/2009 | Gatlin et al. | |
| 7,669,186 B2* | 2/2010 | Nolan et al. | 717/124 |
| 7,673,180 B1 | 3/2010 | Chen et al. | |
| 7,992,133 B1 | 8/2011 | Theroux et al. | |
| 8,752,017 B2* | 6/2014 | Hossain et al. | 717/124 |

(Continued)

OTHER PUBLICATIONS

Zhang, J., et al., CDebugger: A scalable parallel debugger with dynamic communication topology configuration, International Conference on Cloud and Service Computing (CSC), 2011, pp. 228-234, [retrieved on Aug. 26, 2015], Retrieved from the Internet: <URL:http://ieeexplore.ieee.org/>.*

(Continued)

*Primary Examiner* — Thuy Dao
*Assistant Examiner* — Geoffrey St Leger
(74) *Attorney, Agent, or Firm* — Eustace P. Isidore; Yudell Isidore PLLC

(57) ABSTRACT

An apparatus for performing remote debugging in a cloud system. The apparatus includes: a receiving unit that is configured to receive a remote debugging request during a remote debugging session; a determining unit configured to determine, according to an isolation level of the remote debugging request, a server node from a plurality of server nodes in the cloud system that is suitable for performing the remote debugging, wherein the isolation level of the remote debugging request comprises at least one of: an exclusive level and a sharing level; and a transmitting unit configured to forward the remote debugging request to the server node. The apparatus is a front-end component of a cloud system, such as a server node.

17 Claims, 7 Drawing Sheets

(56) References Cited

U.S. PATENT DOCUMENTS

| | | | |
|---|---|---|---|
| 8,972,945 B2* | 3/2015 | Bates | 717/125 |
| 8,972,953 B2* | 3/2015 | Tamm | 717/129 |
| 2003/0204789 A1* | 10/2003 | Peebles et al. | 714/47 |
| 2005/0172168 A1* | 8/2005 | Kilian | G06F 11/362 714/31 |
| 2007/0113218 A1* | 5/2007 | Nolan et al. | 717/124 |
| 2008/0195752 A1* | 8/2008 | Singla | H04L 67/025 709/236 |
| 2011/0252404 A1* | 10/2011 | Park | G06F 11/3664 717/124 |
| 2011/0258614 A1* | 10/2011 | Tamm | 717/129 |
| 2012/0102465 A1* | 4/2012 | Bates | 717/125 |
| 2012/0131555 A1 | 5/2012 | Hossain et al. | |
| 2012/0151452 A1* | 6/2012 | Zinkovsky | G06F 11/362 717/129 |
| 2013/0159779 A1* | 6/2013 | Mickens | G06F 11/3664 714/38.14 |

OTHER PUBLICATIONS

Nezha, R., et al., Extending CloudStudio with collaborative remote debugger, Master of Science Thesis, 2012, 139 pages, [retrieved on Aug. 26, 2015], Retrieved from the Internet: <URL:https://www.politesi.polimi.it/handle/10589/72462>.*

Koop, M.J., et al., Reducing network contention with mixed workloads on modern multicore clusters, IEEE International Cluster Computing and Workshops, 2009, pp. 1-10, [retrieved on Aug. 26, 2015], Retrieved from the Internet: <URL:http://ieeexplore.ieee.org/>.*

Puneet, A., et al., SAP® Certified Application Associate—ABAPTM with SAP NetWeaver® 7.0: Chapter 5 ABAP Debugger Program Usage, Galileo Press, 2009, 46 pages, [retrieved on Aug. 26, 2015], Retrieved from the Internet: <URL:https://www.thali.ch/404handler.aspx?aspxerrorpath=/files/Shop/Documents/013685_Leseprobe.pdf>.*

Method to Implement User Transparent Debugging in a Clustered Application Server Environment, IP.com Prior Art Database Disclosure (Source: IPCOM) Disclosure No. IPCOM000212192D dated Nov. 4, 2011. (Abstract Only).

IBM, Method and Apparatus for Parallelized Debugging, IP.com Prior Art Database Disclosure (Source: IPCOM) Disclosure No. IPCOM000182351D dated Apr. 28, 2009. (Abstract only).

Gioachin et al, "Debugging Large Scale Applications in a Virtualized Environment," Lecture Notes in Computer Science vol. 6548, 2011, (Abstract only).

* cited by examiner

REMOTE DEBUGGING IN A CLOUD COMPUTING ENVIRONMENT

PRIORITY CLAIM

The present application claims benefit of priority from China Patent Application 201310039292.5, filed on Jan. 31, 2013. The content of that application is incorporated by reference herein.

BACKGROUND

1. Technical Field

The present disclosure generally relates to a cloud computing system. More specifically, the present disclosure relates to an apparatus and computer program product for performing remote debugging within a cloud system.

2. Description of the Related Art

In a cloud computing environment, an application is often executed via multiple distributed runtimes. For example, an application may have a servlet-based web user interface (Web UI), a java-based business logic processing component, and a database mapping layer. Further, each component of the application might also be distributed and deployed on many different nodes. However, such a distribution of application documents makes it very difficult to debug the application and determine problems.

The prior art already provides solutions for debugging in a distributed system, such as, a remote debugger connected to multiple nodes in a distributed system or a debugging service for a distributed system that is located by debugging a service registry. However, these solutions have several restrictions and limitations. For example, these solutions cannot be applied to a large-scale production distributed system such as a cloud system. Additionally, these solutions also cannot easily predict which nodes it is desirable to route a debug request to. Further still, it is impossible to connect a debugger to all nodes in a large-scale production distributed system. While a debugging service with a registry locator can resolve this technical problem to a certain extent, it is still difficult for such solution to effectively perform a debug. For example, in a live production environment, while attempting debugging at a node a great amount of other request processes will likely exist. Performing a debugging in a live environment may hang these requests and/or make the debugging harder to execute.

BRIEF SUMMARY

Disclosed are an apparatus and a computer program product for performing remote debugging in a cloud system. In a first aspect of the present disclosure a front-end component of a cloud system receives a remote debugging request during a remote debugging session. In response to the front-end component receiving the remote debugging the front-end component of a cloud system determines, according to an isolation level of the remote debugging request, a server node from a plurality of server nodes in the cloud system for performing the remote debugging, wherein the isolation level of the remote debugging request comprises at least one of: an exclusive level and a sharing level. In response to determining the server node, the front-end component forwards the remote debugging request to the server node.

According to another aspect of the present disclosure, in response to a server node receiving a remote debugging request, the server node switches the mode of the server node from a production mode to a debugging mode, wherein the debugging mode has an isolation level that is adaptive to the remote debugging request. The server node then provides information on the server node to an initiator of the remote debugging request and establishing a debugging connection to the initiator of the remote debugging request to perform a remote debugging process. The server node then determines whether the remote debugging process involves at least one other server node. In response to determining that the remote debugging process involves at least one other server node, the server node transmits a request to perform the remote debugging process to a front-end component of the cloud system.

BRIEF DESCRIPTION OF THE DRAWINGS

The present disclosure can be better understood by referring to the following description when read in conjunction with the accompanying drawings, in which same or similar reference numerals are used to denote same or similar components. The drawings, together with the following detailed description, are included in the specification and form part thereof, and used to further illustrate by way of example preferred embodiments of the present disclosure and explain principles and advantages of the present disclosure.

DETAILED DESCRIPTION OF AN ILLUSTRATIVE EMBODIMENT

Figure 1:
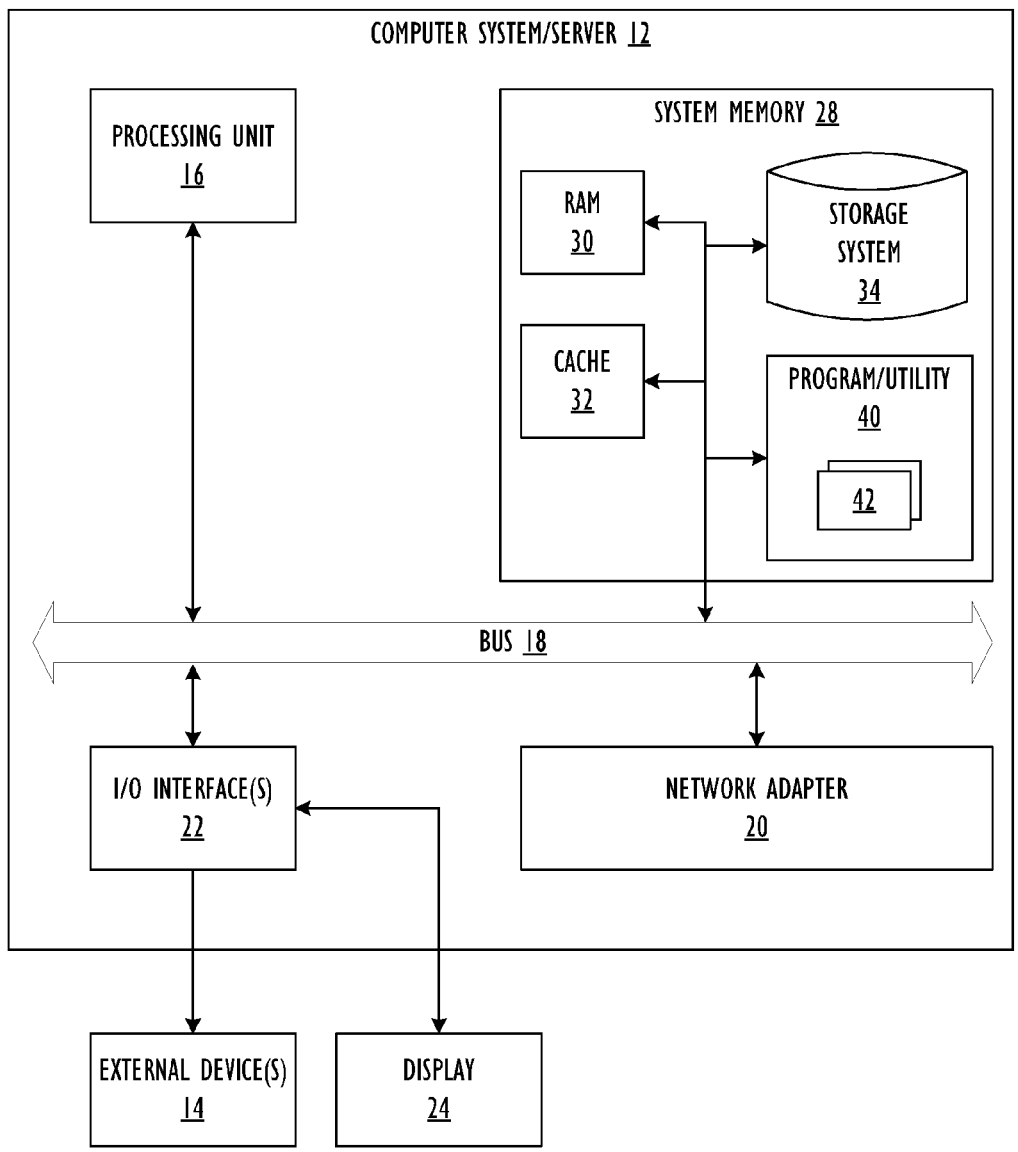
FIG. 1 is a block diagram of a cloud computing node according to an embodiment of the present disclosure.

Described herein are a system or apparatus and computer program product for performing remote debugging of an application in a cloud system while the cloud system is in a production mode. Although an illustrative implementation of one or more embodiments is provided below, the disclosed systems may be implemented using any number of techniques. The present disclosure is not limited to the illustrative implementations, drawings, and techniques illustrated below, including the exemplary designs and implementations illustrated and described herein, but may be modified within the scope of the appended claims along with their full scope of equivalents.

As will be appreciated by one skilled in the art, the present disclosure may be embodied as a data processing system (including, for example, a front-end component or a server of a cloud system), a method, or a computer program product. Accordingly, the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present disclosure may take the form of a computer program product embodied within computer-usable program code embodied in any tangible computer readable medium for performing the various functions of the present disclosure. It will be understood by those skilled in the art that the apparatus that embodies a part or all of the present disclosure may be a general purpose device having at least one processing unit, a memory, and a software executing on the at least one processing unit that is further configured to provide a part or all of an embodiment of the disclosure. This device may be a single device or a group of devices.

It is understood in advance that while this disclosure includes a detailed description on cloud computing, implementation of the teachings recited herein are not limited to a cloud computing environment. Embodiments of the present disclosure may be implemented in conjunction with any other type of computing environment now known or later developed.

A cloud computing environment is service oriented computing solution with a focus on statelessness, low coupling, modularity, and semantic interoperability. At the heart of a cloud computing service is an infrastructure comprising a network of interconnected nodes. Cloud computing is a persistent model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. The present disclosure simplifies the remote debugging processes within the cloud system by enabling remote debugging processes at various isolation levels which thus enable multiple debugging sessions to be performed simultaneously. By isolating a server node for performing debugging from a production environment, the impact of the debugging process on the production environment can be minimized. The cloud model provided by the present disclosure, as described in greater detail below, includes characteristics, service models, and deployment models that enable remote debugging of an application in a cloud system.

Characteristics of the cloud model include: an on-demand self-service, broad network access, resource pooling, rapid elasticity, and measured service. The on-demand self-service enables a cloud consumer to unilaterally provision computing capabilities, such as server time and network storage, as needed automatically without requiring human interaction with the service's provider. Broad network access comprises capabilities are available over a network and accessed through standard mechanisms that promote use by heterogeneous thin or thick client platforms (e.g., mobile phones, laptops, and PDAs). Resource pooling comprises pooling the provider's computing resources to serve multiple consumers using a multi-tenant model, with different physical and virtual resources dynamically assigned and reassigned according to demand. The consumer generally has no control or knowledge over the exact location of the provided resources but may be able to specify location at a higher level of abstraction (e.g., country, state, or datacenter). Rapid elasticity enables capabilities to be rapidly and elastically provisioned, in some cases automatically, to quickly scale out and rapidly released to quickly scale in. To the consumer, the capabilities available for provisioning often appear to be unlimited and can be purchased in any quantity at any time. Measured service enables cloud systems to automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service models of the cloud model include: Software as a Service (SaaS), Platform as a Service (PaaS), and Infrastructure as a Service (IaaS). SaaS provides the capability to the consumer to use the provider's applications running on a cloud infrastructure. The applications are accessible from various client devices through a thin client interface such as a web browser (e.g., web-based e-mail). In a SaaS service model the consumer does not manage or control the underlying cloud infrastructure including network, servers, operating systems, storage, or even individual application capabilities, with the possible exception of limited user-specific application configuration settings. Platform as a Service (PaaS) provides the capability to the consumer to deploy onto the cloud infrastructure consumer-created or acquired applications created using programming languages and tools supported by the provider. In a PaaS service model the consumer does not manage or control the underlying cloud infrastructure including networks, servers, operating systems, or storage, but has control over the deployed applications and possibly application hosting environment configurations. Infrastructure as a Service (IaaS) provides the capability to the consumer to provision processing, storage, networks, and other fundamental computing resources where the consumer is able to deploy and run arbitrary software, which can include operating systems and applications. In a IaaS service model the consumer does not manage or control the underlying cloud infrastructure but has control over operating systems, storage, deployed applications, and possibly limited control of select networking components (e.g., host firewalls).

Deployment models of the cloud model include: private cloud, community cloud, public cloud, and hybrid cloud. In a private cloud deployment model the cloud infrastructure is operated solely for an organization and may be managed by the organization or a third party and may further exist on-premises or off-premises. In a community cloud deployment model the cloud infrastructure is shared by several organizations and supports a specific community that has shared concerns (e.g., mission, security requirements, policy, and compliance considerations). In a community cloud deployment model the cloud infrastructure may be managed by the organizations or a third party and may exist on-premises or off-premises. In a public cloud deployment model the cloud infrastructure is made available to the general public or a large industry group and is owned by an organization selling cloud services. In a hybrid cloud deployment model the cloud infrastructure is a composition of two or more clouds (private, community, or public) that remain unique entities but are bound together by standardized or proprietary technology that enables data and application portability (e.g., cloud bursting for load-balancing between clouds).

Referring now to FIG. 1, there is depicted a schematic of an example of a cloud computing node. In cloud computing node 10 there is a computer system/server 12, which may be any general purpose or special purpose computing system, environment, and/or configuration. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices. Computer system/server 12 may further comprise computer system-executable instructions, such as program modules, being executed by a computer system in a distributed cloud computing environment where tasks are performed by remote processing devices that are linked through a communications network. In a distributed cloud computing environment, program modules may be located in both local and remote computer system storage media including memory storage devices. Generally, program modules may include routines, programs, objects, components, logic, data structures, and so on that perform particular tasks or implement particular abstract data types.

The components of computer system/server 12 may include, but are not limited to, processing unit 16, system memory 28, and bus 18 which couples various system components, including system memory 28, to processing unit 16. In another embodiment, processing unit 16 may include multiple processors or processing units. Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 12 typically includes a variety of computer readable media. Such media may be any available media that is accessible by computer system/server 12, and includes both volatile and non-volatile media, removable and non-removable media. System memory 28 may include computer readable media in the form of volatile memory, such as random access memory (RAM) 30 and/or cache memory 32. Computer system/server 12 may further include storage system 34 for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces (not pictured). System memory 28 may include at least one program product having a set (e.g., at least one) of program modules that are configured to carry out the functions of embodiments of the present disclosure. Program/utility 40, comprises a set (at least one) of program modules 42, stored in system memory 28. Program/utility 40 may comprise, for example, an operating system(s), one or more application programs or other program modules, and program data, each of which may include an implementation of a networking environment. In one embodiment program modules 42 may carry out the functions and/or methodologies of the present disclosure as described herein.

Computer system/server 12 may also communicate with a display 24 and one or more external device(s) 14 such as a keyboard, a pointing device, etc. Additionally, computer system/server 12 may also communicate with one or more devices that enable a user to interact with computer system/server 12 and/or any devices (e.g., network card or a modem) that enable computer system/server 12 to communicate with one or more other computing devices via Input/Output (I/O) interfaces 22. Further still, computer system/server 12 may communicate with one or more networks such as a local area network (LAN), a general wide area network (WAN), and/or a public network (e.g., the Internet) via network adapter 20.

As depicted, network adapter 20 communicates with the other components of computer system/server 12 via bus 18. In one embodiment, computer system/server 12 may also include other components such as redundant processing units, external disk drive arrays, RAID systems, tape drives, and data archival storage systems, etc.

Figure 2:
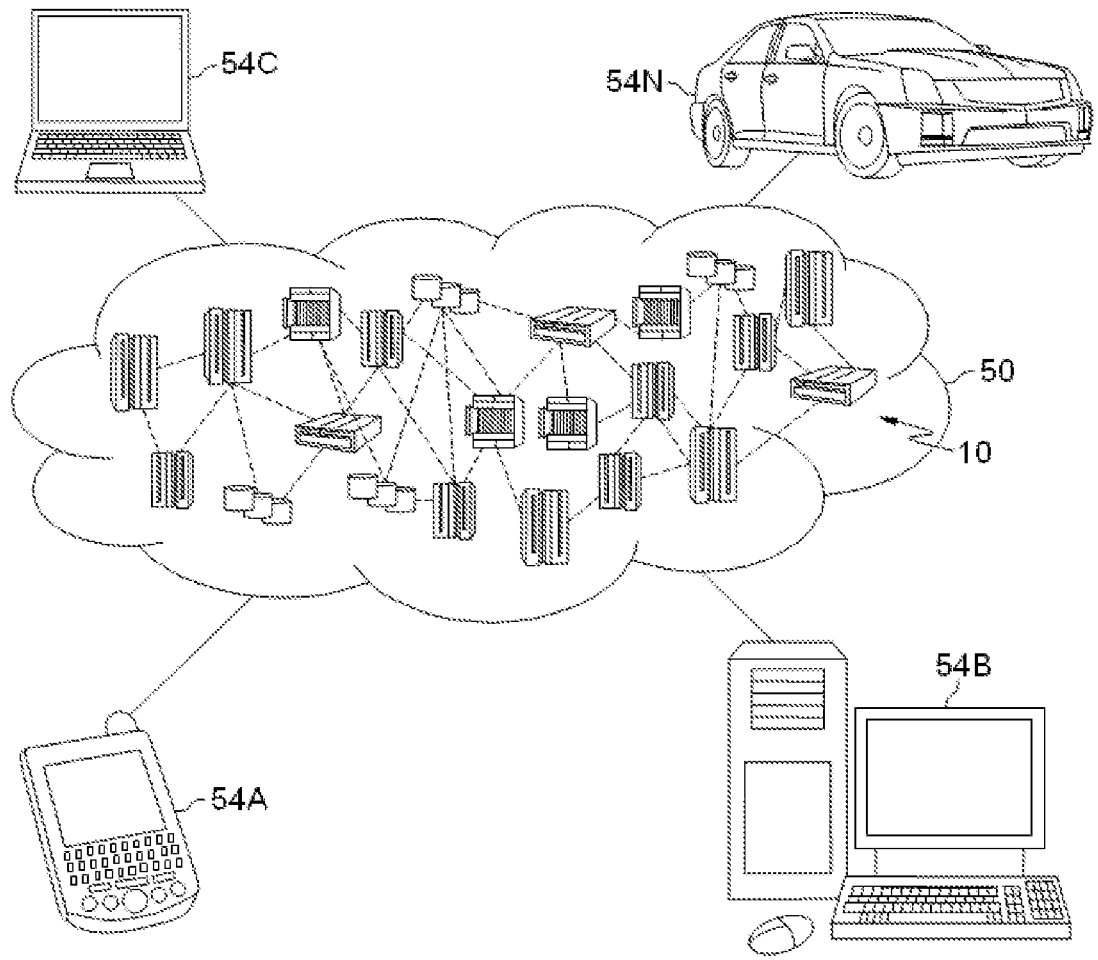
FIG. 2 is a block diagram of a cloud computing environment according to an embodiment of the present disclosure.

Referring now to FIG. 2, there is depicted a block diagram of a cloud computing environment according to an embodiment of the present disclosure. As shown, cloud computing environment 50 comprises one or more cloud computing nodes 10 that are connected to consumer devices 54*a-n* and which intercommunicate with each other. Computing nodes 10 may be grouped (not shown) physically or virtually, in any of one or more networks, such as Private, Community, Public, or Hybrid clouds as described hereinabove, or any combination thereof. This enables cloud computing environment 50 to offer infrastructure, platforms and/or software as services to a consumer device such that a consumer utilizing a consumer device does not need to maintain resources on a local device. Consumer devices 54*a-n* may include, for example, one or more of: personal digital assistants (PDA) or cellular telephones 54*a*, desktop computers 54*b*, laptop computers 54*c*, and/or automobile computer systems 54*n* may communicate. The types of computing devices 54*a-n* shown in FIG. 2 are intended to be illustrative only and that computing nodes 10 and cloud computing environment 50 can communicate with any type of computerized device over any type of network and/or network addressable connection (e.g., using a web browser).

Figure 3:
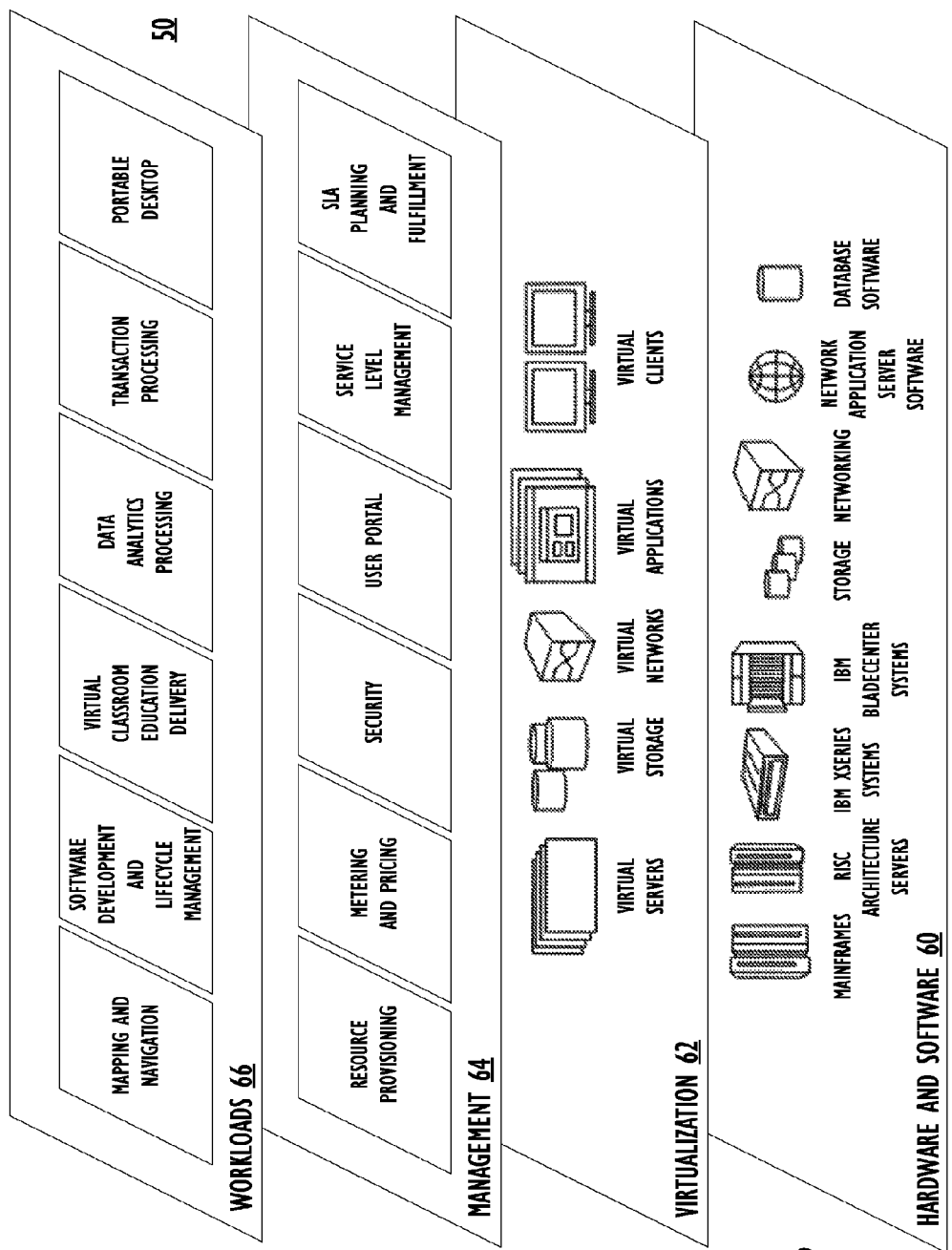
FIG. 3 is a block diagram of an abstraction model layers according to an embodiment of the present disclosure.

Referring now to FIG. 3, there is depicted a block diagram of abstraction model layers of a cloud computing environment 50 according to an embodiment of the present disclosure. The components, layers, and functions shown in FIG. 3 are intended to be illustrative only and embodiments of the present disclosure are not limited thereto. As depicted, the following layers and corresponding functions are provided: hardware and software layer 60, virtualization layer 62, management layer 64, and workloads layer 66.

Hardware and software layer 60 includes hardware and software components. Hardware components may include, for example, mainframes (e.g., IBM® zSeries® systems), Reduced Instruction Set Computer (RISC) architecture based servers (e.g., IBM pSeries® systems), IBM xSeries® systems, IBM BladeCenter® systems, storage devices, and networks and networking components. Examples of software components may include, for example, network application server software, (e.g. IBM WebSphere® application server software) and database software (e.g., IBM DB2®, database software).

Virtualization layer 62 provides an abstraction layer from which may include such virtual entities as: virtual servers, virtual storage, virtual networks (including virtual private networks), virtual applications and operating systems, and virtual clients.

Management layer 64 provides resource provisioning, metering and pricing, security, user portal, service level management, and Service Level Agreement (SLA) planning and fulfillment for the cloud computing environment. Resource provisioning provides dynamic procurement of computing resources and other resources that are utilized to perform tasks within the cloud computing environment. Metering and pricing provides cost tracking as resources are utilized within the cloud computing environment and billing or invoicing for consumption of these resources. These resources may further include application software licenses. Security provides identity verification for both consumers and tasks of the cloud computing environment, as well as protection for data and other resources of the cloud computing environment. The user comprises provides one or more portal(s) that may be used as an access point to utilize or administer the cloud computing environment for consumers and system administrators. Service level management enables allocation and management of cloud computing resources to ensure required service levels are met. SLA planning and fulfillment provides pre-arrangement for, and procurement of, cloud computing resources in accordance with a particular SLA in order to meet an anticipated future requirement. Management layer 64 may also provide functions for performing remote debugging in a cloud system according to one or more embodiments of the present disclosure, and for: determining a server node in the cloud system which will perform a remote debugging in the cloud system according to an isolation level of the remote debugging request; isolating the server node which will perform the remote debugging from other server nodes in a production environment of the cloud system by switching mode of the server node which will perform the remote debugging from a production mode to a debugging mode. This switching thereby ensures the availability of the production environment during debugging the session and providing a clean process for performing the remote debugging.

Workloads layer 66 provides functions for which the cloud computing environment may be utilized. Examples of workloads and functions which may be provided from this layer include: mapping and navigation, software development and lifecycle management, virtual classroom education delivery, data analytics processing, transaction processing, and portable desktop.

Figure 4:
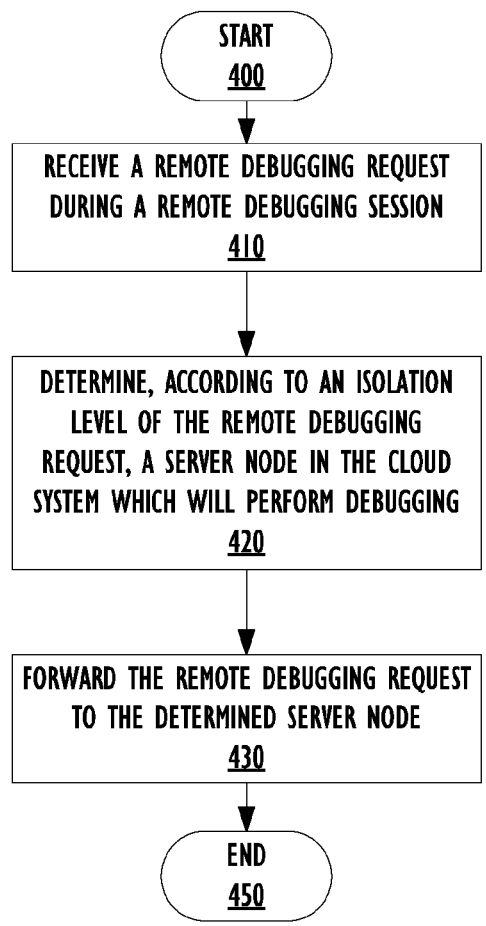
FIG. 4 is a flow diagram of a method for performing remote debugging in a cloud system according to an embodiment of the present disclosure.

With reference now to FIG. 4, there is depicted a flow chart of a method for performing remote debugging in a cloud system according to one embodiment of the present disclosure. The process begins at step 400. At step 410, a front-end component of a cloud system receives a remote debugging request during a remote debugging session. The front-end component of the cloud system may include a load equalizer for processing all external requests or a message bus component for processing internal requests of the cloud system. In another embodiment the front-end component of the cloud system comprises any of: a load equalizer, a message bus that is configured to maintain information on cloud system loads, and a registry that identifies and maintains states (also referred to herein as modes) of the various server nodes of the cloud system and associates identifiers of debugging sessions with particular server nodes of the various server nodes of the cloud system.

In the cloud system, the remote debugging request is a start point of an application logic. In one embodiment, the remote debugging request may be an HTTP request for a web application or any JMS message received outside of the system. Using an HTTP request as an example, a browser plug-in may be created when an end user operates a Web application running in the cloud system. The browser plug-in may automatically insert an HTTP request header (e.g., _DEBUG_ MODE_: true/false and other general parameters for the debug) for each remote debugging request. According to another embodiment, in order to initiate a remote debugging of the cloud system, a customized remote debugging request may be used to embed debugging information contained therein. An end user may initiate a remote debugging session by means of a debugging tool which may be, for example, a client integrated into a development environment. A debugger may create and send a remote debugging request containing debugging information to the cloud system.

At step 420, the front-end component of the cloud system determines, based on an isolation level of the received remote debugging request, a server node of the various server nodes in the cloud system that is suitable for performing the remote debugging. The isolation level of the remote debugging request indicates a debugging mode which the server node is required to operate within in order to perform the debugging process that is requested by the remote debugging request. In one embodiment the isolation level of the remote debugging request may be determined from a request which directly indicates the isolation level of the remote debugging request. Alternatively, the isolation level of the remote debugging request may be determined according to the characteristics of an application to be debugged. The isolation level of the remote debugging request may also be automatically determined by any appropriate system component of the cloud system such as a debugger or a front-end component.

In one embodiment, the isolation level of the remote debugging request may comprise any of an exclusive level and a sharing level. An exclusive level isolation level indicates that the requested remote debugging process requires that the requested remote debugging process exclusively occupies a server node during a debugging session and that the server node will not respond to any other remote debugging requests or any other requests in a production mode. A sharing level isolation level indicates that the requested remote debugging process requires that the requested remote debugging process exclusively occupies a server node during a debugging session and that the server will not respond to any other requests in a production mode. However, the sharing level isolation level allows a server to still respond to other remote debugging requests.

According to one embodiment, when the isolation level of the remote debugging request is the exclusive level, the front-end component of the cloud system may select a suitable server node that is operating in a production mode as the server node which will perform the remote debugging. The front-end component of the cloud system may then update the registry to set the selected server node to an exclusive debugging mode such that an identifier of the debugging session has a one-to-one association with the identifier of the selected server node.

According to one embodiment, when the isolation level of the remote debugging request is the sharing level, the front-end component of the cloud system may select an existing server node that is operating in a sharing debugging mode as the server node which will perform the remote debugging. The front-end component of the cloud system may then update the registry to add an association between an identifier of the debugging session and an identifier of the selected server node. If it is determined that an existing server node that is operating in a sharing debugging mode is currently unavailable, the front-end component of the cloud system may select a server node of the cloud system that is operating in a production mode to perform the remote debugging. The front-end component of the cloud system may then update the registry to set the operating mode of the selected server node to the sharing debugging mode and associate the identifier of the debugging session with the identifier of the selected server node.

At step 430, the front-end component of the cloud system forwards the remote debugging request to the determined server node. The process then ends at step 450.

The above steps do not include all possible steps for performing a remote debugging in a cloud system. For example, after forwarding the remote debugging request (step 430), the remote debugging process can be executed in a corresponding server node of the cloud system. Additional processing may also occur by the selected server or the front-end component after the remote debugging session ends. For example, in response to the end of the remote debugging session, the front-end component of the cloud system may update the registry dependent on a state of the server node. If, at the end of the remote debugging session, the isolation level of the processed debugging request is the exclusive level, the front-end component of the cloud system may directly release the server node from operating in the exclusive debugging mode and update the registry accordingly to reflect the change in the state of the server node. If, at the end of the remote debugging session, the isolation level of the processed debugging request is the sharing level, then the cloud system front-end may determine whether there is still any association between the identifier of the debugging session and the identifier of the server node. In response to determining that there is no association between the identifier of the debugging session and the identifier of the server node, the cloud system front-end may release the server node from operating in the sharing debugging mode. In another embodiment, in response to the remote debugging request being already explicitly bound with a particular server node, the cloud front-end may be configured to directly extract the server node information bound in the remote debugging request in order to perform a look up of the server node in the registry to forward the remote debugging request to the server node.

Figure 5:
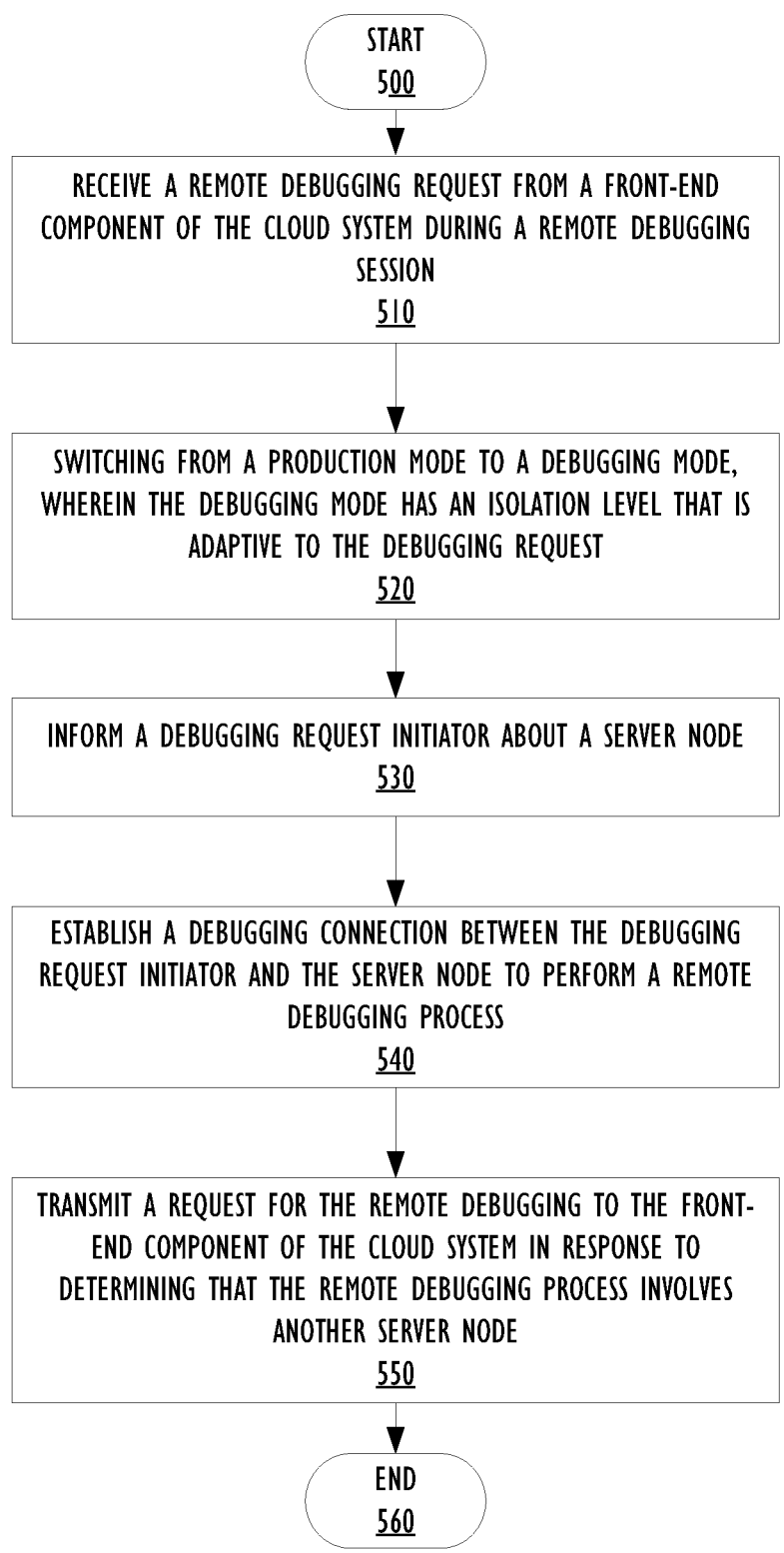
FIG. 5 is a flow diagram of a method for remote debugging according to an embodiment of the present disclosure.

With reference now to FIG. 5 there is depicted a flow chart of a method for performing remote debugging in a cloud system, according to an embodiment of the present disclosure. The method begins at start block 500. At step 510, a server node receives a remote debugging request from a front-end component of the cloud system during a remote debugging session. The receiving of the remote debugging request may be performed by a request inceptor that is maintained by the server node. In one embodiment, a request inceptor may be installed for each runtime type so as to extract the debugging information from an incoming request. For example, for a Web container JVM, a servlet filter may act as the inceptor to receive all incoming HTTP requests. For a business component, a corresponding message proxy may be configured as an inceptor to receive an incoming request and extract debugging information therefrom.

In step 520, if the server node receiving the remote debugging request is currently operating in the production mode, the server node is switched from the production mode to the debugging mode, wherein the debugging mode has an isolation level adaptive to the debugging request. In one embodiment, the server node receiving the remote debugging request may be configured to broadcast a message to indicate that it has received the new debugging request. The server may then switch its mode from a production mode to a debugging mode (this may be accomplished by restarting the server node or performing a runtime restart, for example). The isolation level of the remote debugging request may comprise any of an exclusive level and a sharing level. In response to the isolation level being the exclusive level, the mode of the server node is switched to the exclusive debugging mode which allows the server node to establish a debugging connection to a unique debugging request initiator. In response the isolation level being the sharing level and the mode of the server being the production mode, the mode of the server node is switched from the production mode to the sharing debugging mode. Once the server node is switched to the sharing debugging mode (or if the server node is already in the sharing debugging mode) the server node is allowed to establish multiple debugging connections to multiple debugging request initiators simultaneously.

At step 530, the server node provides information about the server node to the debugging request initiator. In one embodiment this information may include a broadcast message that indicates the current working mode of the server node. In another embodiment this information may include information to inform the debugging request about the server node itself such as the current running IP address, the debugging listening port number, etc.

At step 540, a debugging connection between the debugging request initiator and the server node is established to perform a remote debugging process. In response to determining that the remote debugging process involves a further server node, the server node transmits a request for remote debugging to a front-end component of the cloud system (step 550). For example, when the debugging application comprises a remote method call, the debugging request might necessitate involvement of another server node. Thus, the request inceptor for the current server node may insert the debugging information into the remote debugging request, and the server node transmits the remote debugging request containing debugging information to the front-end component of the cloud system. In one embodiment, transmitting of the remote debugging request containing the debugging information may be transmitted to the front-end component of the cloud system by a message bus component. The process then terminates at block 560.

Figure 6:
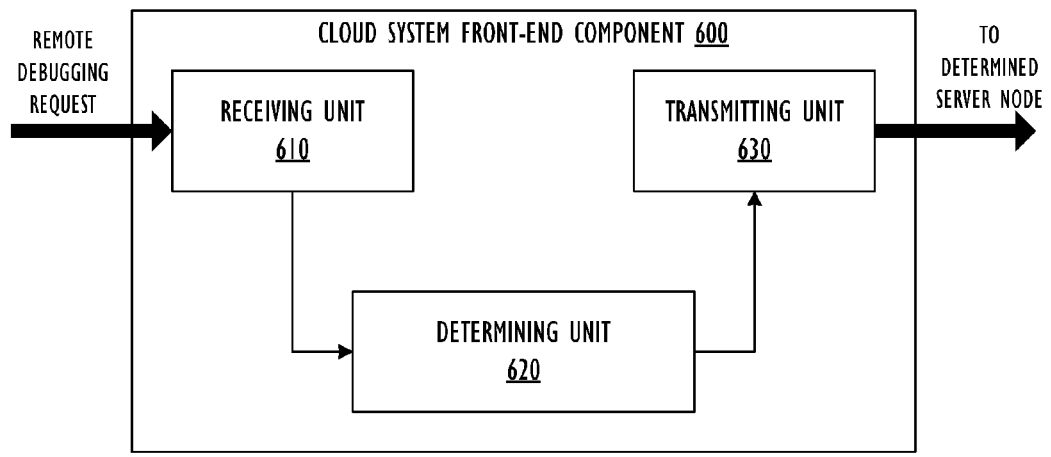
FIG. 6 is a block diagram of a front-end component of a cloud system according to an embodiment of the present disclosure.
Figure 7:
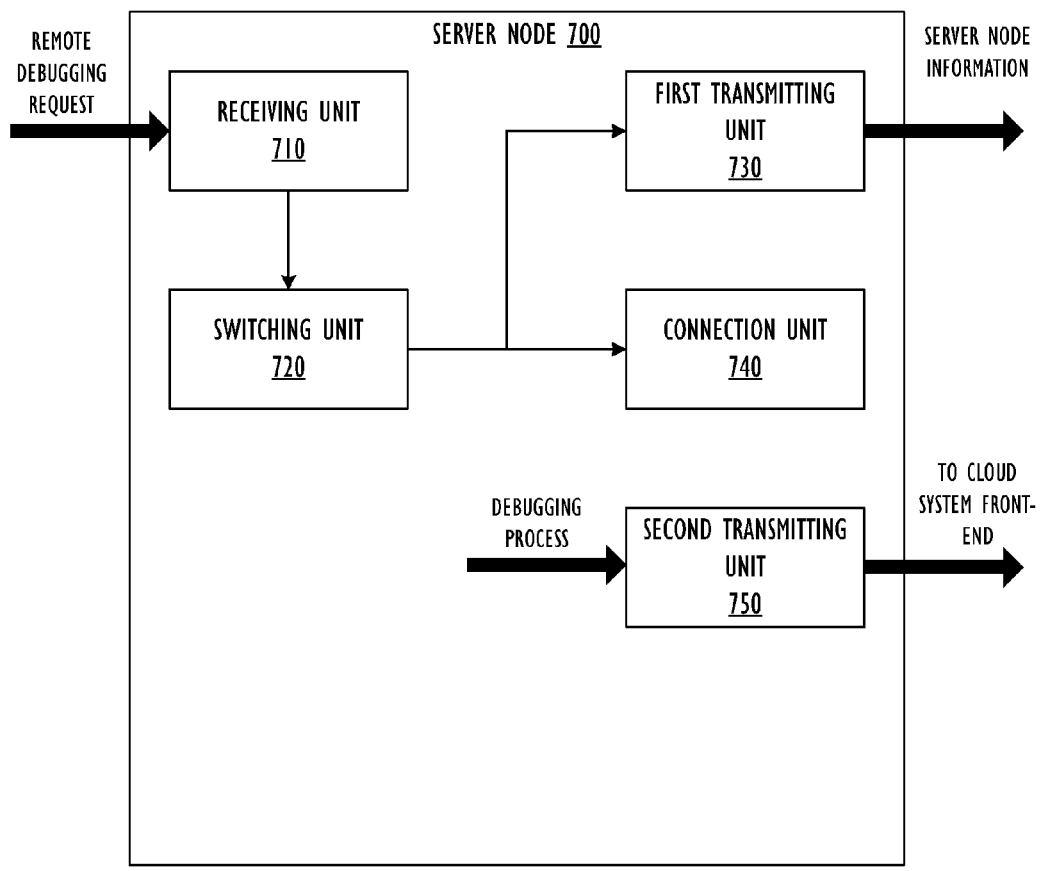
FIG. 7 is a block diagram of a server node according to an embodiment of the present disclosure.

FIGS. 6 and 7 depict block diagrams of an apparatus according to one or more embodiments of the present disclosure. However, these block diagrams do not depict all logical or functional components of these apparatuses that may be included, but rather only depict components associated with the functionality of the present disclosure. Besides the components depicted, cloud system front-end component 600 of FIG. 6 and server node 700 of FIG. 7 may further comprise additional components for implementing respective functions known in the art which may or may not have signaling or logical relations with the components depicted in the present drawings.

With reference now to FIG. 6, there is depicted a block diagram of a front-end component of a cloud system according to one embodiment of the present disclosure. The front-end component of the cloud system may be, for example, a load equalizer for processing all external requests or a message bus component for processing internal requests of the cloud system. Cloud system front-end component 600 comprises a receiving unit 610, a determining unit 620, and a transmitting unit 630. Receiving unit 610 comprises one or more message inceptors each of which is configured for intercepting a request message for each specific runtime type. Receiving unit 610 may also be configured to receive a request with an HTTP request header for remote debugging. Additionally, receiving unit 610 may also be additionally or alternatively configured to receive Java Message Service (JMS) messages that includes debugging information. Further still, receiving unit 610 may also be configured to receive other production requests so as to run a normal production process while receiving the remote debugging request.

Determining unit 620 is configured to determine, according to an isolation level of the received remote debugging request, a server node suitable for performing the remote debugging process. In the cloud system, a front-end component of the cloud system such as a load equalizer and a message bus is configured to maintain information on a current load of the cloud system and a registry of each server node in the cloud system. Determining unit 620 may be further configured to determine a server node for performing debugging based on information about the cloud system load and a working mode of each server node in the cloud system. Determining unit 620 of cloud system front-end component 600 may also be further configured to determine whether an association between the identifier of the debugging session and the identifier of the server node also exists. In response to determining that there is no association between the identifier of the debugging session and the identifier of the server node, the registry updating unit of the cloud system front-end component 600 may release the server node operating in the sharing debugging mode.

When it is determined that the isolation level of the debugging request is the exclusive level, determining unit 620 may select a server node that is currently operating in the production mode for performing the remote debugging. Cloud system front-end component 600 may also include a registry updating unit (not shown) for updating the registry to set the selected server node to an exclusive debugging mode such that the identifier of the debugging session has a one-to-one association with the identifier of the selected server node.

When it is determined that the isolation level of the debugging request is the sharing level, determining unit 620 may select an existing server node of the cloud system that is currently operating in a sharing debugging mode for performing the remote debugging. The registry updating unit (not shown) of the front-end component of the cloud system may then update the registry to add an association between the identifier of the debugging session and the identifier of the selected server node. In response to determining unit 620 determining that a server node operating in the sharing debugging mode is currently unavailable, determining unit 620 may select a server node that is currently operating in the production mode for performing the remote debugging. The registry updating unit (not shown) of cloud system front-end component 600 then may update the registry to set the current mode of the selected server node to the sharing debugging mode. The registry updating unit may then also associate the identifier of the debugging session with the identifier of the selected server node. In one embodiment, the registry update unit of cloud system front-end component 600 may also be further configured to release the server node in response to end of the remote debugging session, as discussed above with respect to FIG. 4. Transmitting unit 630 is configured to forward a debugging request to a server node determined by the determining unit 620.

With reference now to FIG. 7, there is depicted a block diagram of a server node according to one embodiment of the present disclosure. As shown in FIG. 7, server node 700 comprises a receiving unit 710, a switching unit 720, a first transmitting unit 730, a connection establishment unit 740, and a second transmitting unit 750.

Receiving unit 710 is configured to receive a remote debugging request from a front-end component of a cloud system during a remote debugging session. Receiving unit 710 may comprise, for example, an installed request inceptor for each runtime type that can extract the debugging information from an incoming request.

Switching unit 720 is configured to control switching of server node 700 from the production mode to the debugging mode adaptive to the debugging request when the server node 700 is currently operating in the production mode. In one embodiment, switching unit 720 may switch modes of server node 700, such as from the production mode to the debugging mode, by performing reset operations such as node re-start or runtime restart.

First transmitting unit 730 is configured to provide the debugging request initiator with information about the server node (e.g., the currently running IP address and the debugging listening port number, etc.) in order to inform the debugging request initiator about server node 700. First transmitting unit 730 may also broadcast its own information. Second transmitting unit 750 is configured to transmit a request for the remote debugging to the front-end component of the cloud system in response to determining that the remote debugging process involves an additional server node. For example, when the debugging application performed by the server node 700 contains a remote method call, second transmitting unit 750 may transmit a remote debugging request containing the debugging information to a front-end component of the cloud system such as a message bus component. Connection establishing unit 740 is configured to establish a debugging connection between the debugging request initiator and the server node to perform the remote debugging process.

The flowchart and block diagrams in the figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions in the flowcharts may occur out of the order noted in the figures. For example, two blocks shown in succession may, in fact, be executed substantially concurrently, or the blocks may sometimes be executed in the reverse order, depending upon the specific functionality and implementation involved. It should also be noted that each block in the block diagrams and/or flowcharts and a combination of blocks in the block diagrams and/or flowcharts may be implemented by a dedicated hardware-based system for performing specified functions or operations or by a combination of dedicated hardware and computer instructions.

The present disclosure is described above with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in any combination of one or more computer usable or computer readable medium(s) that are capable of directing a computer or other programmable data processing apparatus to function in a particular manner, such that the instructions stored in the computer usable or computer readable medium(s) produce an article of manufacture including instruction means which implement the function/act specified in the flowchart and/or block diagram block or blocks. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to wireless, wireline, optical fiber cable, RF, etc.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

Computer program code for carrying out operations of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer or server may be connected to the user's computer through any type of network, including a local area network (LAN) or a wide area network (WAN), or the connection may be made to an external computer (for example, through the Internet using an Internet Service Provider).

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A front-end component of a cloud system having a memory, comprising:
   a receiving unit that is configured to receive a remote debugging request during a remote debugging session, wherein the remote debugging request specifies a remote debugging process;
   a determining unit configured to:
      automatically determine an isolation level associated with the remote debugging request, wherein the isolation level of the remote debugging request comprises at least one of: an exclusive level and a sharing level, wherein a server node receiving the remote debugging request is only allowed to respond to other remote debugging requests and establish multiple simultaneous debugging connections during the remote debugging process when the isolation level is the sharing level, and wherein in response to the isolation level being the exclusive level, the server node is exclusively occupied by the remote debugging process during the remote debugging session and does not respond to any other remote debugging requests or other requests in a production mode; and
      select, as the server node, a particular node from a plurality of server nodes in the cloud system that is suitable for performing the remote debugging based on the isolation level of the remote debugging request; and
   a transmitting unit configured to forward the remote debugging request to the server node.

2. The front-end component of the cloud system according to claim 1, further comprising:
   a registry updating unit that is configured to update a registry of the cloud system to identify a current debugging mode of the server node, wherein the registry identifies the current debugging mode of each of the plurality of server nodes in the cloud system.

3. The front-end component of the cloud system according to claim 2, wherein the registry updating unit is configured to release the server node from operating in an exclusive debugging mode.

4. The front-end component of the cloud system according to claim 2, wherein the registry updating unit is configured to:
   determine whether there is an association between an identifier of the remote debugging session and an identifier of the server node; and
   in response to determining that there is no association between the identifier of the debugging session and the identifier of the server node, release the server node from operating in a sharing debugging mode.

5. The front-end component of the cloud system according to claim 1, wherein:
   the determining unit selects the particular node as the server node responsive to the particular node operating in the production mode for the remote debugging session and the isolation level of the remote debugging request being the exclusive level; and
   the front-end component of the cloud system further comprises a registry updating unit that is configured to update a registry to set a current operating mode of the server node to an exclusive debugging mode, wherein during the exclusive debugging mode an identifier of the remote debugging session is associated in a one-to-one manner with an identifier of the server node.

6. The front-end component of the cloud system according to claim 1, wherein:
   the isolation level of the remote debugging request is the sharing level;
   the determining unit selects the particular node as the server node for the remote debugging session based on the particular node already operating in a sharing debugging mode; and
   the front-end component of the cloud system further comprises a registry update unit that is configured to update a registry to add an association between an identifier of the debugging session and an identifier of the server node.

7. The front-end component of the cloud system according to claim 6, further comprising:
in response to the determining unit determining that there is currently no server node of the plurality of server nodes that is operating in the sharing debugging mode, select the particular node as the server node for the remote debugging session based on the particular node operating in the production mode; and
wherein the registry update unit is configured to update the registry to set the server node to the sharing debugging mode.

8. The front-end component of the cloud system according to claim 1, wherein the determining unit is further configured to select the particular node as the server node based on a load of the cloud system.

9. The front-end component of the cloud system according to claim 8, wherein the determining unit is further configured to select the particular node as the server node based on an operating mode of each of the plurality of server nodes in the cloud system.

10. The front-end component of the cloud system according to claim 1, wherein the isolation level indicated a particular debugging mode that a server node receiving the remote debugging request is required to operate in to perform the remote debugging process.

11. The front-end component of the cloud system according to claim 1, wherein in response to the isolation level being the sharing level, the server node is exclusively occupied by the remote debugging request during the remote debugging process.

12. A server node of a cloud system having a memory, comprising:
a receiving unit that is configured to receive a remote debugging request from a front-end component of the cloud system during a remote debugging session, wherein the remote debugging request specifies a remote debugging process;
a switching unit that is configured to in response to receiving the remote debugging request, switch the server node from a production mode to a debugging mode, wherein the debugging mode has an isolation level that is adaptive to the remote debugging request, and wherein the isolation level comprises at least one of: an exclusive level and a sharing level, wherein the server node is only allowed to respond to other remote debugging requests and establish multiple simultaneous debugging connections during the remote debugging process when the isolation level is the sharing level, and wherein in response to the isolation level being the exclusive level, the server node is exclusively occupied by the remote debugging process during the remote debugging session and does not respond to any other remote debugging requests or other requests in a production mode;
a first transmitting unit that is configured to provide an initiator of the remote debugging request with information about the server node, wherein the information comprises a broadcast message that indicates a current operating mode of the server node;
a connection establishing unit that is configured to establish a debugging connection between the initiator of the debugging request and the server node to perform the remote debugging process; and
a second transmitting unit that is configured to:
determine whether the remote debugging process involves at least one other server node; and
in response to determining that the remote debugging process involves at least one other server node, transmit a request to perform the remote debugging process to the front-end component of the cloud system.

13. The server node according to claim 12, wherein the connection establishing unit is further configured to:
in response to the isolation level being the exclusive level, only allow a debugging connection to the server node to be established with the initiator of the remote debugging request.

14. The server node according to claim 12, wherein the connection establishing unit is further configured to:
in response to the isolation level being the sharing level, allow a plurality of debugging request initiators to establish a plurality of simultaneous debugging connections with the server node.

15. The server node according to claim 12, wherein the information further comprises a current internet protocol (IP) address and a debugging listening port number of the server node.

16. The server node according to claim 12, wherein the isolation level indicates a particular debugging mode that the server node is required to operate in to perform the remote debugging process.

17. The server node according to claim 12, wherein the isolation level indicates a particular debugging mode that the server node is required to operate in to perform the remote debugging process, and wherein in response to the isolation level being the sharing level, the server node is exclusively occupied by the remote debugging request during the remote debugging process.

* * * * *